Oct. 23, 1934.  M. B. BECK ET AL  1,977,614
ELECTRIC STREET LIGHTING BULB
Filed July 6, 1931   5 Sheets-Sheet 3

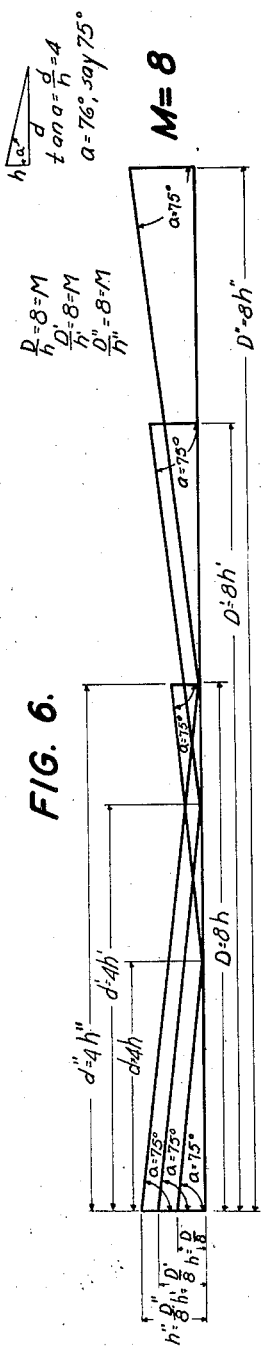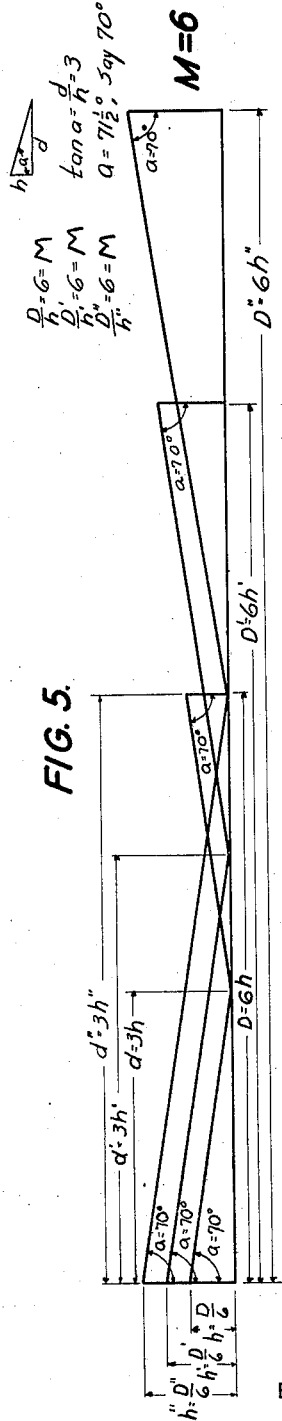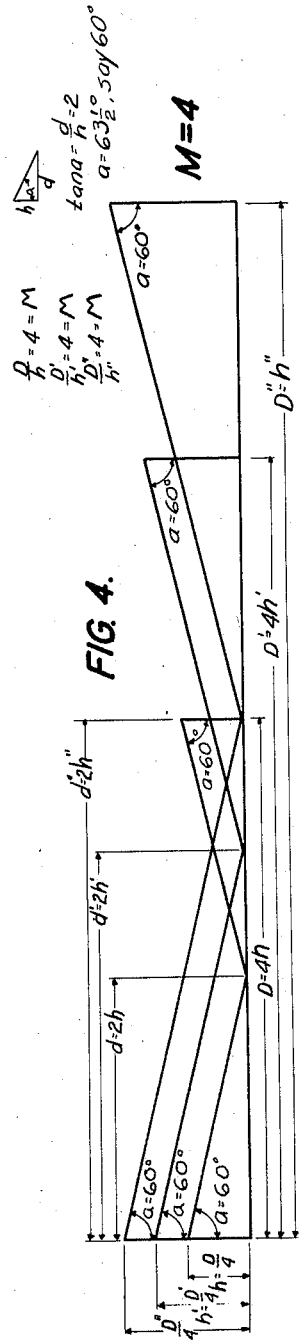

FIG. 7.

STREET LIGHTING DATA

Prototype Curve Values for Uniform Horizontal Illumination.

Formulae:

When $\alpha$ is less than $\tan^{-1}\frac{M}{2}$ ···· $(cp.)\alpha = K\dfrac{1+\sin\cos^{-1}\frac{\tan\alpha}{\frac{1}{2}M}}{\cos^3\alpha}$ When $\alpha$ is less than $\tan^{-1}\frac{M}{2}$ ···· $(cp.)\alpha = K\dfrac{1-\sin\cos^{-1}\frac{M-\tan\alpha}{\frac{1}{2}M}}{\cos^3\alpha}$

| Angle $\alpha$ | Equated to 100 cp. when $\alpha$ =0 | | | | | Equated to curve of 1000 lumens. | | | | |
|---|---|---|---|---|---|---|---|---|---|---|
| | M=4 | M=6 | M=8 | M=12 | M=16 | M=4 | M=6 | M=8 | M=12 | M=16 |
| 0° | 100 | 100 | 100 | 100 | 100 | 74 | 39 | 19 | 9 | 5 |
| 5° | 101 | 101 | 101 | 101 | 101 | 74 | 40 | 19 | 9 | 5 |
| 15° | 111 | 111 | 111 | 111 | 111 | 81 | 44 | 21 | 10 | 6 |
| 25° | 133 | 134 | 134 | 135 | 135 | 98 | 52 | 25 | 12 | 7 |
| 35° | 177 | 180 | 181 | 181 | 182 | 130 | 70 | 33 | 16 | 9 |
| 45° | 264 | 275 | 278 | 281 | 282 | 195 | 108 | 52 | 25 | 14 |
| 55° | 450 | 497 | 512 | 522 | 525 | 331 | 195 | 95 | 46 | 27 |
| 60° | 600 | · | · | · | · | 442 | · | · | · | · |
| 61° | 628 | · | · | · | · | 463 | · | · | · | · |
| 62° | 648 | · | · | · | · | 477 | · | · | · | · |
| 63° | 637 | · | · | · | · | 470 | · | · | · | · |
| 64° | 462 | · | · | · | · | 340 | · | · | · | · |
| 65° | 415 | 1126 | 1222 | 1281 | 1301 | 306 | 414 | 227 | 113 | 66 |
| 67°30' | · | 1422 | · | · | · | · | 557 | · | · | · |
| 70° | 276 | 1752 | 2159 | · | · | 204 | 687 | 400 | · | · |
| 71° | · | 1813 | · | · | · | · | 710 | · | · | · |
| 72° | · | 1312 | · | · | · | · | 514 | · | · | · |
| 72°30' | · | · | 2959 | · | · | · | · | 548 | · | · |
| 74° | · | 1083 | · | · | · | · | 425 | · | · | · |
| 75° | 26 | · | 3930 | 5155 | 5445 | 19 | · | 729 | 454 | 276 |
| 75°58' | 0 | · | · | · | · | 0 | · | · | · | · |
| 76° | · | 888 | 3272 | · | · | · | 348 | 606 | · | · |
| 77°30' | · | · | · | 8180 | · | · | · | · | 721 | · |
| 78° | · | 545 | 2407 | · | · | · | 213 | 446 | · | · |
| 80° | · | · | 1784 | 12665 | 16270 | · | · | 331 | 1114 | 824 |
| 80°32' | · | 0 | · | · | · | · | 0 | · | · | · |
| 80°52' | · | · | 0 | · | · | · | · | 0 | · | · |
| 81° | · | · | · | 8895 | 21070 | · | · | · | 783 | 1066 |
| 82° | · | · | · | 7775 | 27025 | · | · | · | 685 | 1369 |
| 82°30' | · | · | · | · | 29550 | · | · | · | · | · |
| 82°52' | · | · | · | · | 26100 | · | · | · | · | 1321 |
| 83° | · | · | · | 6460 | 22400 | · | · | · | 569 | 1133 |
| 84° | · | · | · | 3940 | 18150 | · | · | · | 347 | 920 |
| 85° | · | · | · | · | 11050 | · | · | · | · | 560 |
| 85°14' | · | · | · | 0 | · | · | · | · | 0 | · |
| 86°25' | · | · | · | · | 0 | · | · | · | · | 0 |
| | K=50 | K=50 | K=50 | K=50 | K=50 | K=36.8 | K=19.6 | K=9.27 | K=4.40 | K=2.53 |

FIG. 9.

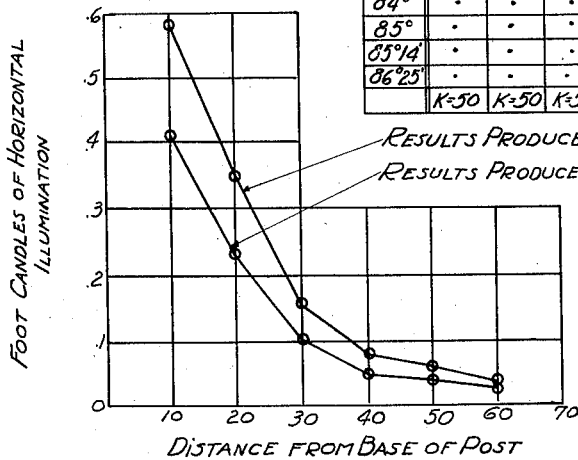

— RESULTS PRODUCED BY OUR PROCESS
— RESULTS PRODUCED BY REFRACTION

INVENTORS
Morris B. Beck
BY John O. Whittaker
Harry Lee Dodson
ATTORNEY

Oct. 23, 1934.  M. B. BECK ET AL  1,977,614
ELECTRIC STREET LIGHTING BULB
Filed July 6, 1931    5 Sheets-Sheet 5

Patented Oct. 23, 1934

1,977,614

UNITED STATES PATENT OFFICE 1,977,614

ELECTRIC STREET LIGHTING BULB

Morris B. Beck, New York, and John D. Whittaker, Babylon, N. Y., assignors to Welsbach Street Lighting Company of America, Philadelphia, Pa., a corporation of Delaware Application July 6, 1931, Serial No. 548,953

3 Claims. (Cl. 240—25)

Our invention relates to that class of electric street-lighting bulbs, as set forth in our copending application for Street illumination, Serial No. 636,239.

It is well known that the bare electric light bulb is not only wasteful in the extreme when used for this purpose, but it does not even afford satisfactory illumination for the street surface. It is the consensus of scientific opinion that in order to obtain proper illumination, the mass of light emitted by the bare lamp must be moulded and directed into a distribution where the light flux will be delivered in a manner which will assure that kind of street lighting which has been termed planned scientific lighting or prototype lighting.

In the pursuit of ideal street lighting the analysis of adequate street lighting requirements as set forth in said aforementioned application makes it necessary to determine the ideal light-distribution curves which are utilizable for lighting the street surfaces for the various ratios of spacing distances to mounting heights. Such ideal light-distribution curves are called prototype curves.

Prototype curves will therefore be understood to be families of curves that will produce a predetermined character of illuminating effect under varying conditions of spacing distance and mounting height. The curves belonging to any one family are distinguished from each other by the circumstance that each curve relates to a different ratio of spacing distance to mounting height, and so long as this ratio is not varied, the relative distribution of light over the illuminated area will follow the same law, no matter how the spacing distance and mounting height are varied.

Our invention has been illustrated herein as well as in the aforementioned application Serial No. 636,239, Patent No. 1,891,136, by way of example, in relation to a system of prototype curves for attaining illumination in which the aim is to have the horizontal illumination intensity at any point of the surface of a street equal to that at any other point; in other words, the illumination of the surface will be uniform. This type of illumination is advocated by many illuminating engineers, but it will be obvious that our invention is equally applicable to prototype street illumination in which uniformity of this type is not contemplated.

Prototype illumination requires further that the normal spherical distribution from the source be modified to give a non-spherical distribution.

In the embodiment herein disclosed, just as in said application Serial No. 636,239, we show the attainment of prototype illumination by the association with a bulb of reflecting areas illustrated in the embodiment as formed by coating certain portions of the bulb surface with an opaque specular reflecting substance which will redistribute the light from the source in accordance with the desired prototype.

Our invention therefore has for its object to produce an apparatus which will constitute a concrete embodiment of the invention set forth in the said aforementioned application.

Other objects are the provision in an electric incandescent bulb for prototype street illumination of means for preventing excessive heating of the bulb, for illuminating the canopy of the globe enclosing the bulb and for effecting slight illumination of the houses adjoining a street. This last result, is to that extent, supplementary to the result ordinarily desired in prototype street lighting, in which it is aimed to divert as much as possible of the light into the street itself. However, in our invention this new result is effected without noticeable change in the efficiency of the prototype distribution.

While our invention has been described in relation to prototype street illumination, it will be understood, that in certain aspects, it may have other applications.

As described in the aforementioned application we have set forth with great accuracy the status of the problem of planned scientific street lighting before our invention was discovered. This status was, briefly, that it was thought impossible to produce any desired prototype distribution without the aid of outside accessories in addition to the outer enclosing globe and the electric light bulb. We will show, in what follows, how the solution of the problem is made possible by our invention.

For the purpose of deriving the light-distribution curves for uniform horizontal street illumination, we have used the well known formulæ (1) and (2), given below:

*Formulæ*

When $a$ is less than $$\tan^{-1}\frac{M}{2}\text{-------}(cp.)a = K\frac{1-\sin\cos^{-1}\frac{\tan a}{\frac{1}{2}M}}{\cos^3 a}$$

When $a$ is greater than $$\tan^{-1}\frac{M}{2}\text{-------}(cp.)a = K\frac{1-\sin\cos^{-1}\frac{M-\tan a}{\frac{1}{2}M}}{\cos^3 a}$$

The symbols used in these formulæ have been explained in what follows.

It is possible for one sufficiently versed in mathematics by means of these formulæ, to ascertain by the accompanying description, how such curves are constructed, reference being made to the accompanying drawings.

We shall proceed to describe the invention by which we are able, as demonstrated in actual street lighting practice, to accomplish the objects herein set forth.

Referring specifically to the drawings:

Fig. 4 is a diagram showing the relation of varying spacing distances to mounting heights for the values of M corresponding to Fig. 1;

Fig. 5 is a diagram showing the relation of varying spacing distances to mounting heights for the values of M corresponding to Fig. 2;

Fig. 6 is a diagram showing the relation of varying spacing distances to mounting heights for the values of M corresponding to Fig. 3;

Fig. 7 is a tabulation of prototype curve, candlepower values when various values of M are substituted in Formulæ (1) and (2);

Fig. 9 is a graph showing results obtained in an actual street lighting installation, utilizing a street lighting unit, constructed in accordance with our process, in comparison with a street lighting unit constructed by an exponent of the handling of light by refraction as hereinbefore outlined;

Figure 1:
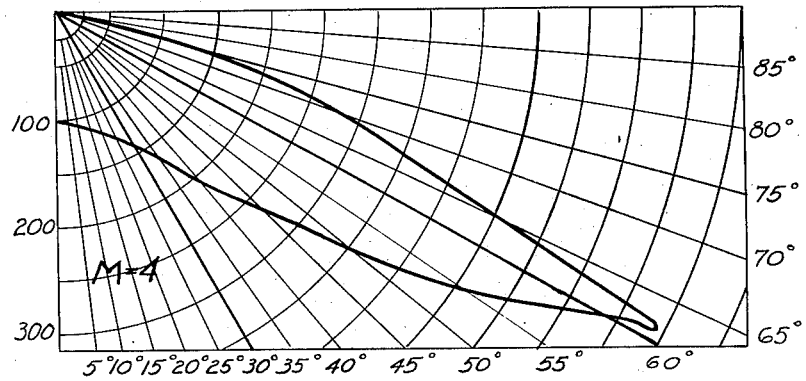
Fig. 1 is a diagram of the ideal prototype curve for street lighting where $M=4$.
Figure 2:
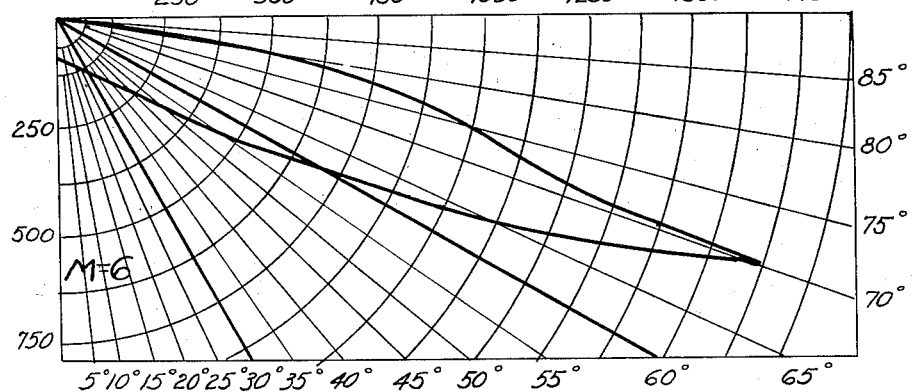
Fig. 2 is a diagram of the ideal prototype curve for street lighting where $M=6$.
Figure 3:
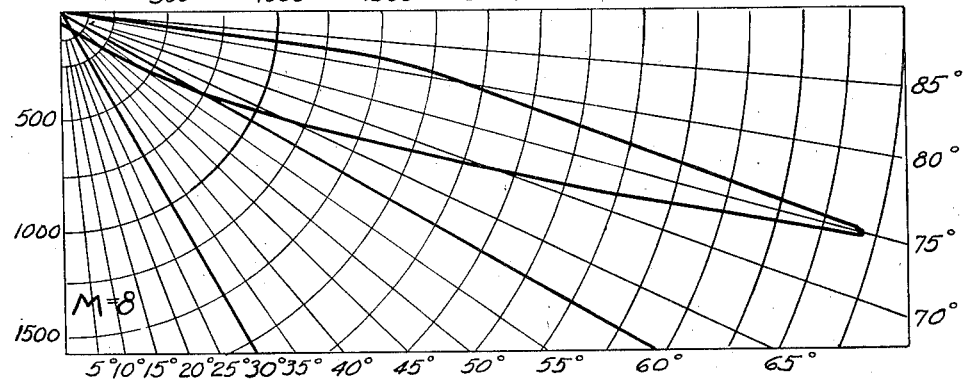
Fig. 3 is a diagram of the ideal prototype curve for street lighting where $M=8$.
Figure 8:
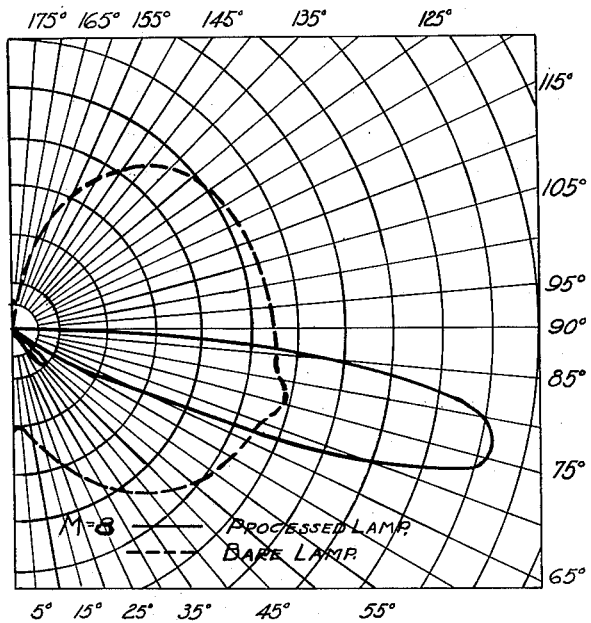
Fig. 8 is a comparison of a light-distribution curve actually attained in practice from a street lighting unit constructed in accordance with our process with the light-distribution curve of a bare, gas-filled, tungsten-filament, incandescent, series street-lamp.
Figure 10:
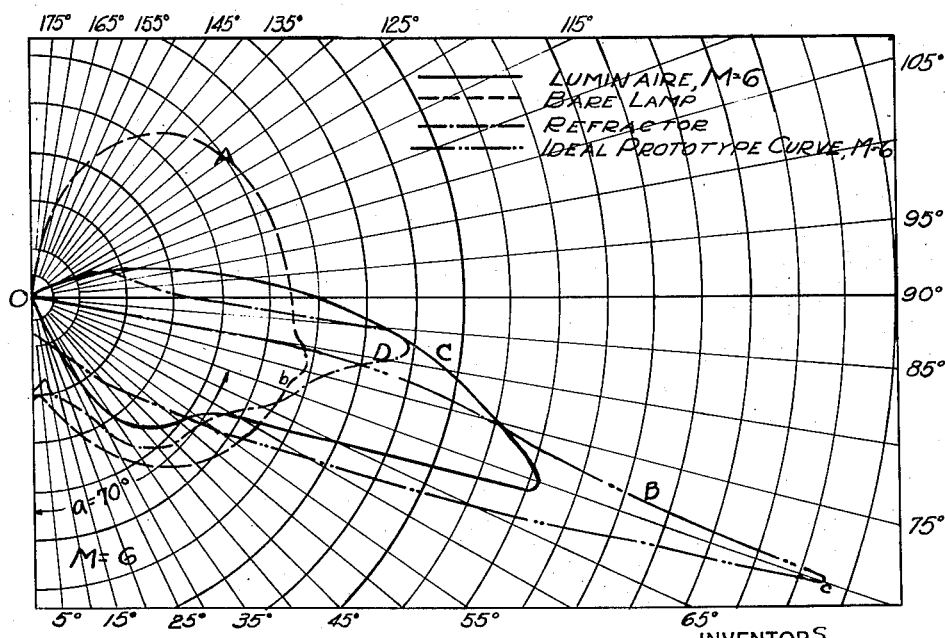
Figure 11:
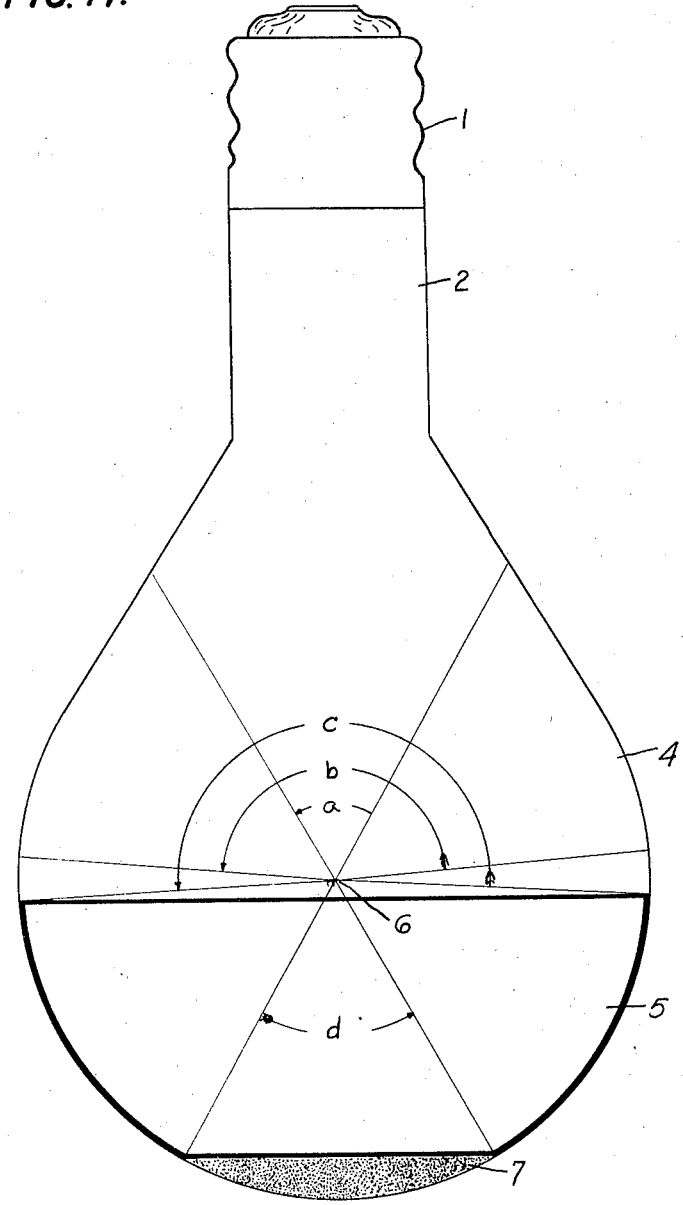

Fig. 10 is a comparison of the light distribution curves of a bare lamp, a street lighting unit constructed in accordance with our process, and the ideal prototype curve for $M=6$, together with a distribution curve from a street lighting unit actually constructed by an exponent of the handling of light by refraction as hereinbefore outlined; and Fig. 11 is a view of one form of our improved electric street lighting bulb with frosted or diffusive zone.

In referring to the drawings and graphs, a series of symbols will be employed, a tabulation and description of which will now be given.

$a=$Angular direction of a ray of light measured from the nadir or point directly below the lamp. This represents the Greek symbol alpha.

cp.=candlepower of a light emitted from a street lighting unit on a direction along the angle $a$.

$K=$a constant governing the amount of flux included within the prototype curve.

$$M = \frac{\text{distance between adjacent light units}}{\text{height of light unit above street}}$$

$h, h', h''=$various heights of the street-lighting units.

$D, D', D''=$various spacing distances corresponding to the above mounting heights.

$d, d', d''=$various distances from base of post to midpoints between units.

In planning practical street lighting systems utilizing our invention, it is only necessary to follow the procedure now given in our specifications. If we assume that substantially uniform horizontal illumination is the result desired and assuming, also, the value of $M=6$, we may calculate and construct by means of the prototype curve-values given in Fig. 7 an ideal prototype curve.

Having constructed such a prototype curve of light-distribution, we now have a pattern to guide us in the design of the deflecting surface or surfaces, to be placed upon our electric light bulb and their magnitude and location, or placement. Since the light emanating from the usual forms of electric light bulbs, when in its natural state, as far as the shape of its curve of distribution is concerned, is very poorly adapted to the production of effective, practical illumination of almost any specific work space and especially for the uniform horizontal illumination of the streets, boulevards, highways, and other thoroughfares, as well as airports and other large outdoor public spaces, where planned scientific illumination is desired, it is necessary to so alter and remold the natural tore, or solid of light emitted by the bare street lamp as shown in curve A Fig. 10, as to reshape it into practical compliance with the shape indicated by the ideal prototype curve B in Fig. 10.

Fortunately it is within the ability of practical illuminating engineers to accomplish this purpose with the aid of our invention, because the crude mass of light sent out by the usual form of electric light bulbs is a very plastic medium, and each and every ray of it can, by using our invention, be easily bent by reflection and redirected into useful planes and the whole light-mass, molded into an ideal form for the solution of a given problem, such as planned scientific street lighting, providing by the use of our invention the means for the transformation of the natural non-useful light-mass from these bare electric light bulbs be provided. It is with an incandescent electric bulb which will produce the resultant transformation in an effective, efficient and useful manner that our invention is concerned.

In Fig. 10:

Curve A represents the light-distribution from a bare street-lighting lamp.

Curve B represents the light-distribution from a prototype curve.

Curve C represents the light-distribution from a street-lighting unit constructed in accordance with our process.

Curve D represents the light-distribution from a street-lighting unit equipped with a prismatic refractor.

We may now proceed with the transformation of the bare-lamp curve into the prototype by determining the additive and subtractive values of candlepower at all angles to reshape it for practical use.

$Ob$ from curve A (Fig. 10) =bare lamp candle power directed at angle $a$.

$Oc$ from curve B (Fig. 10) =required prototype candle power at angle $a$.

$bc$ (Fig. 10) =candle power required to be added to $Ob$ to produce $Oc$.

Since $Oc=Ob+bc$

Therefore $bc=Oc-Ob=$candle power required to be added to $Ob$ to produce $Oc$.

By repeating the above process for each 10 degrees, starting with 5° from the nadir, the required additive and subtractive candlepower needed at each angle can be ascertained.

Assuming that the candlepower value at the center of each 10 degrees zone represents its average candlepower, the flux of light required to be added to each zone can be calculated by the aid of the following table which gives the factors by which these candlepower values should be multiplied to give the zonal lumens or the lumens required in each 10 degree zone.

These factors are the equivalents of the actual square feet in these zones on a sphere of one-foot radius.

*Multiplying factors to obtain zone lumens from average zone candlepower*

| Zone | | Multiplying factor |
|---|---|---|
| 0 to 10° | 170 to 180° | 0.095 |
| 10 to 20° | 160 to 170° | 0.283 |
| 20 to 30° | 150 to 160° | 0.463 |
| 30 to 40° | 140 to 150° | 0.628 |
| 40 to 50° | 130 to 140° | 0.774 |
| 50 to 60° | 120 to 130° | 0.897 |
| 60 to 70° | 110 to 120° | 0.992 |
| 70 to 80° | 100 to 110° | 1.058 |
| 80 to 90° | 90 to 100° | 1.091 |

When extreme accuracy, or accuracy greater than that given by the above choice of 10 degree zones and their constants is desired, zonal angles of any desired magnitude may be chosen and in like manner their constants determined and used.

The 10 degree zone chosen herein is the one made use of in all practical work of this character in illuminating engineering.

To use these factors with the curve of any lighting unit, the candlepower at 5 degrees is multiplied by the 0 to 10 degree factor to obtain lumens in the 0 to 10 degree zone; the candlepower at 15 degrees is multiplied by the 10 to 20 degree zone factor to obtain the lumens in the 10 to 20 degree zone, etc. The total lumens for any large zone is the sum of the lumens thus determined in all of the 10 degree sections of the zone.

Having thus determined the deficiencies of the bare lamp-distribution in zonal lumens for each of the 10 degree zones as above outlined and having determined the required additive and subtractive lumens needed in each zone, we then spread a suitable specular reflective substance over such predetermined areas on the surface of the light bulb itself to supply the already ascertained deficiencies in each zone.

In Figure 11 is shown an embodiment of our invention in which the bulb is to be used with the base down, so that the tip portion, or portion opposed to the base, will be located uppermost. In order to throw the light down, as is necessary for prototype street illumination, the tip portion of the bulb receives a reflecting coating. Since such coating hinders the dissipation of heat, we have found it desirable, to avoid overheating of the bulb—(a condition which shortens its life)—to provide an opening in the reflecting coating which will permit heat to escape readily and this opening may be made in the form of a polar cap, as shown in Figure 11.

In forming this heat-transmitting opening, we attain other objects of the invention, namely the utilization of part of the light, emitted by the filament for illuminating the canopy or upper portion of the globe surrounding the bulb, and also illuminating the houses adjoining the street. For, the heat-transmitting opening is also light-transmitting. In order, however, to properly use the light passing through the opening for the purpose intended, it is desirable to scatter the rays as much as possible, and this we attain by making the opening in the reflecting surface light-diffusing, this being accomplished by treating the glass surface of the bulb in any well-known manner. In this manner the light transmitted by the diffusing cap will be scattered and will serve to illuminate the globe while the light reflected thereby will be scattered within the bulb and will not be directed toward or adjacent to the incandescent filament of the bulb, so as to help to raise its temperature.

As shown in Figure 12 (1) indicates the base, (2) the neck portion, (4) a clear portion, (5) a coated zone, (6) the center of the filament, and (7) the spherical tip portion of the bulb, coated with a diffusing medium. This bulb is adapted for use in the base down position.

The following table gives the values of the various angles locating the zonal coatings under different ratios of spacing distance to mounting height and different burning positions of our improved electric street lighting bulb.

TABLE OF ANGULAR VALUES

*Lamp burning base down*

| M | a | b | c | d |
|---|---|---|---|---|
| 4 | 0° | 0° | 203° | 60° |
| 6 | 0° | 0° | 187° | 60° |
| 8 | 0° | 0° | 178° | 60° |

Having thus described our invention and illustrated its use, what we claim as new and desire to secure by Letters Patent is:

1. In a street lighting system for obtaining an approximation of prototype illumination on the surface of a street, in which illuminating units are mounted at a uniform elevation and in uniform spaced relation above the street surface, an incandescent electric bulb adapted to serve as such a unit when used with its base positioned lowermost, said bulb having a portion of its surface opposed to its base spherical and having a portion of said spherical surface in the form of a zonal band coated with a reflecting medium, for the purpose of redirecting a portion of the light emitted by the incandescent filament of the bulb to obtain an approximation of the distribution required for prototype illumination, and the lower edge of said zonal band being located approximately in a horizontal plane passing through the filament, and said bulb further having the portion of its surface between said zonal band and the tip portion of the bulb, and including the tip portion, light-transmitting, the edge of the zonal surface adjacent said light-transmitting portion subtending an angle of not more than sixty degrees at the center of the filament said light transmitting portion being adapted to diffuse the light transmitted whereby, when the bulb is used base down, the heat will be transmitted upwardly through said tip portion.

2. For use with a street lighting system for obtaining an approximation of prototype illumination on the surface of a street, in which illuminating units are mounted in uniformly spaced relation at a uniform elevation above the street surface, an incandescent electric bulb to serve as such a unit, when mounted with its base lowermost, said bulb having a portion of its surface opposed to its base of spherical contour, and a portion of said spherical surface in the form of a zonal band coated with a reflecting medium for the purpose of redirecting a portion of the light emitted by the incandescent filament of the bulb to obtain an approximation of the distribution required for prototype illumination, one edge of said zone being located in the equatorial region and the other edge being in the polar region of said spherical surface portion and the polar portion surrounded by the reflecting zone being light-transmitting whereby, when the bulb is used base down, the heat will be transmitted upwardly through said tip portion.

3. For use with a street lighting system for obtaining an approximation of prototype illumination on the surface of a street, in which illuminating units are mounted in uniformly spaced relation at a uniform elevation above the street surface, an incandescent electric bulb to serve as such a unit when mounted with its base lowermost, said bulb having a portion of its surface opposed to its base of spherical contour, and a portion of said spherical surface in the form of a zonal band coated with a reflecting medium for the purpose of redirecting a portion of the light emitted by the incandescent filament of the bulb to obtain an approximation of the distribution required for prototype illumination, one edge of said zone being located in the equatorial region and the other edge being in the polar region of said spherical surface portion and the polar portion surrounded by the reflecting zone being light-transmitting and light-diffusing.

MORRIS B. BECK.
JOHN D. WHITTAKER.